United States Patent [19]
Liu et al.

[11] Patent Number: 5,960,010
[45] Date of Patent: Sep. 28, 1999

[54] ERROR DETECTION AND ERROR CONCEALMENT OF CONVOLUTIONALLY ENCODED DATA

[75] Inventors: Christine N. Liu, Dallas, Tex.; Wilfrid P. LeBlanc, Vancouver, Canada; Vishu R. Viswanathan, Plano, Tex.

[73] Assignee: Texas Instruments Incorporated, Dallas, Tex.

[21] Appl. No.: 08/850,429

[22] Filed: May 2, 1997

Related U.S. Application Data

[60] Provisional application No. 60/016,859, May 3, 1996.
[51] Int. Cl.$^6$ ................................................ G06F 11/10
[52] U.S. Cl. ..................... 371/43.1; 370/252; 370/447; 341/50; 371/43.5; 371/43.1; 371/43.6; 371/43.8
[58] Field of Search ...................... 370/252, 447; 341/50; 371/43.5, 43.1, 43.6, 43.8

[56] References Cited

U.S. PATENT DOCUMENTS

| | | | |
|---|---|---|---|
| 5,229,767 | 7/1993 | Winter et al. | 341/50 |
| 5,432,778 | 7/1995 | Minde et al. | 370/95.3 |
| 5,502,713 | 3/1996 | Lagerqvist et al. | 370/17 |

OTHER PUBLICATIONS

Lee, L. H. C., "New Rate–Compatible Punctured Convolutional Codes for Viterbi Decoding," IEEE Transactions on Communications, vol. 42, No. 12, Dec. 1994., pp. 3073–3079.

Hagenauer, J., "Rate–Compatible Punctured Convolutional Codes (RCPC Codes) and Their Applications," IEEE Transactions on Communications, vol. 36, No. 4, Apr. 1988, pp. 389–400.

G. David Forney, Jr., *The Viterbi Algorithm*, 61 Proceedings of the IEEE, Mar. 1973, at 268–278.

*Primary Examiner*—William Grant
*Assistant Examiner*—Iván Calcaño
*Attorney, Agent, or Firm*—Robert L. Troike; Richard L. Donaldson

[57] ABSTRACT

An improved error detection and error concealment for Viterbi decoding of convolutionally encoded data is provided. The most sensitive part of the data is parity encoded and sent with parity and this data with the next most sensitive data are convolutionally encoded and sent with the least sensitive data over a transmission channel to a receiver. At the receiver the convolutionally encoded data is decoded using the Viterbi algorithm. The decoder compares the parity computed from decoded data with the decoded parity and if they are not equal generates a Bad Frame Indicator (BFI) flag and also determines which decoded parameters are likely bad and hence generates a Bad Parameter Indicator (BPI) flag for those parameters, by determining the confidence levels for the parameters and comparing against pre-selected thresholds. The decision to discard a decoded parameter is dependent on the BFI flag and the BPI flag of that parameter.

8 Claims, 4 Drawing Sheets

ERROR DETECTION AND ERROR CONCEALMENT OF CONVOLUTIONALLY ENCODED DATA

This application claims priority under 35 USC §119(e)(1) of provisional application Ser. No. 60/016,859, filed May 3, 1996.

TECHNICAL FIELD OF THE INVENTION

This invention relates to encoded speech data and more particularly to data that includes convolutionally encoded data.

BACKGROUND OF THE INVENTION

In digital cellular environment, acoustic background noise and channel bit errors (both bursty and random) may severely degrade the performance of speech coders such as the current European GSM (Global System for Mobile Communication) full rate standard. In this standard, every 20 milliseconds a total of 456 bits are sent. 260 of these bits represent the speech signal and 196 bits are added for protection against channel bit errors. In digital speech compression, it is relatively common to have a number of classes of bits with different perceptual importance. Further, for some bits (or parameters) it has been beneficial to have an indication of the likelihood of whether or not these certain key parameters are corrupt. In the GSM standard, there is a Class 1a which consists of 50 of the most sensitive bits. For this most sensitive bits there are added three parity bits. There is a second sensitive Class 1b of 132 bits and of these 132 bits there are added four tail bits used to reset a convolutional coder. There is also a Class 2 which is considered the least sensitive bits (78 bits) and these are sent with out any additional bits for protection against channel bit errors. The very sensitive bits with the parity bits and the sensitive bits along with the tail bits sum up to 189 bits. Convolution coding at the rate of 1/2 convolutional coding is done to generate a forward error correction coding. The total number of bits with the error correction coding is 378 bits, each 20 millisecond frame. To this is added the 78 least sensitive bits which are not error protected, to provide every 20 milliseconds (a frame) a total of 456 bits. At the receiver, the foregoing 378 bits undergo a Viterbi decoding. This is an efficient decoding algorithm for convolution coding, well known to those skilled in the art. This decoding step produces 189 bits for the very sensitive bits and sensitive bits. From the very sensitive 50 bits, the 3-bit parity is calculated and compared to the decoded parity bits. If the two sets of parity bits are not equal, a Bad Frame Indicator (BFI) is generated. When this is generated, the source decoder declares a bad frame and substitutes the information from the previous frame.

Referring to FIG. 1 there is illustrated this prior art system. The speech is encoded in the source encoder 12. The parity bits are added by the parity encoder 14. The convolutional encoder 16 generates the 378 bits to which is added the least sensitive 78 bits without any error protection encoding. The signals are sent via a channel 18 to a receiver. At convolution decoder 20 of the receiver the decoder 20 decodes using the Viterbi algorithm and the parity decoder 22 determines if the three bit parity matches the parity computed from the decoded very sensitive 50 bits and if there is no failure or mismatch, the 260 bits (=50 very sensitive bits+132 sensitive bits+78 least sensitive bits) are then provided out of the source decoder 26. If there is a parity error (parity bits calculated from the 50 bits do not match the decoded 3-bit parity) this is detected at detector 24 and the BFI signal is sent to the Source Decoder 26 and all of the data in that frame is discarded.

In a Viterbi algorithm decoder, as used to decode convolutionally encoded information, reliability information is developed for various path metrics computed within the Viterbi algorithm. The metrics in the Viterbi algorithm estimate the likelihood of incorrect reception of various speech coder parameters and this is passed on to the speech or source decoder. These confidence measures from the Viterbi decoding have been proposed to be used generally for rejecting bad parameters or accepting good parameters in frames.

It is highly desirable to provide an enhanced GSM full rate system with an improved method and system for decoding, to provide acceptable speech quality under bad channel conditions.

SUMMARY OF THE INVENTION

In accordance with one embodiment of the present invention, an improved error detection and error concealment for Viterbi decoding for convolutionally encoded data is provided wherein there is provided parity bits for the very sensitive bits and encoding said very sensitive bits and parity bits with convolutional coding. At the Viterbi decoder, decoding said very sensitive bits and comparing the computed parity bits with the decoded parity bits to determine if a bad frame indicator occurs and further decoding the convolutionally encoded information using a Viterbi algorithm and determining confidence levels of separate parameter sets. The decision to discard the received bits is jointly dependent upon the bad frame indicator and said confidence levels of said parameter sets.

These and other features of the invention that will be apparent to those skilled in the art from the following detailed description of the invention, taken together with the accompanying drawings.

DESCRIPTION OF PREFERRED EMBODIMENT OF THE PRESENT INVENTION

Figure 1:
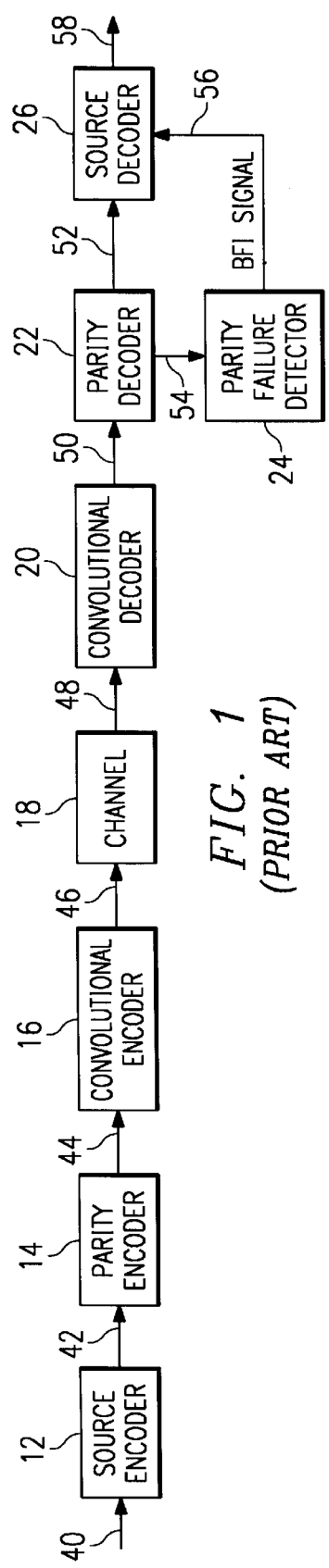
FIG. 1 is a block diagram of a GSM full rate speech coder system.
Figure 2:
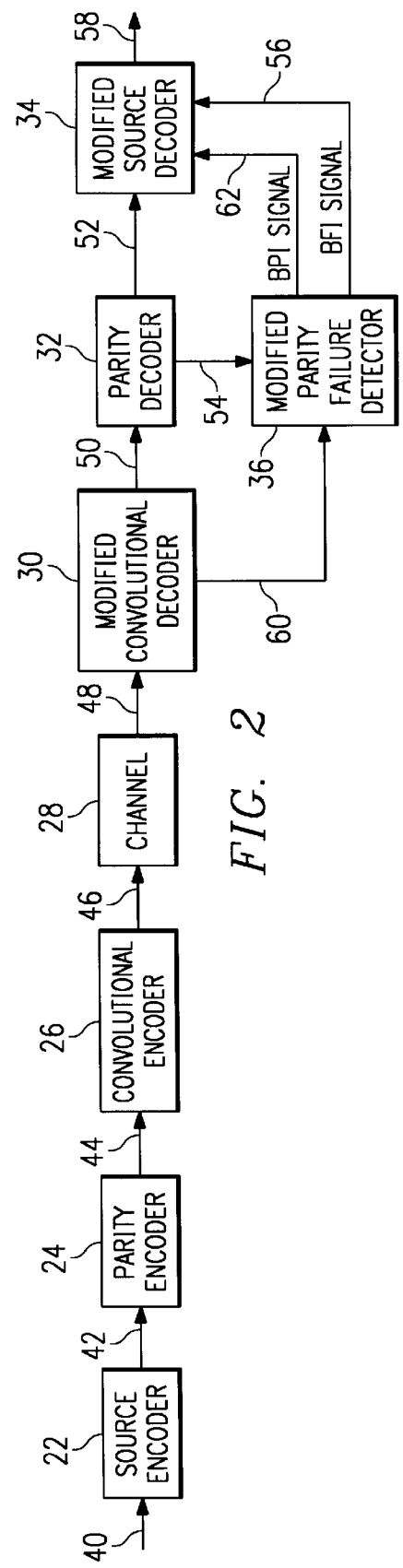
FIG. 2 is a block diagram of a coder system according to one embodiment of the present invention.
Figure 4:
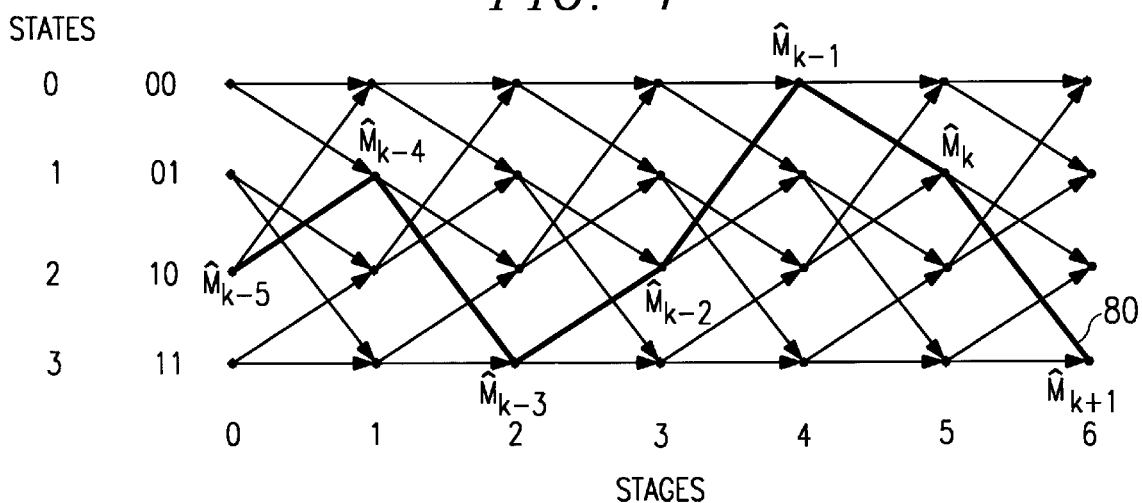
FIG. 4 is an example of the trellis used in a four state Viterbi decoder.

Referring to FIG. 2 there is illustrated a coder system in accordance with one embodiment of the present invention. The input signals at source 40 are encoded by source encoder 22. The encoded source signals may be, for example, the 260 bits every 20 milliseconds (a frame) in GSM full rate standard system. Some of the encoded source signals at 42 are parity encoded at parity encoder 24 to produce the encoded source and parity signals at 44. This may represent, for example, the very sensitive 50 bits plus 3 parity bits (or perhaps the alternative of 6 parity bits or some other parity level), and 132 sensitive bits with 4 tail bits. The tail bits are used to reset the convolutional coder at the end of each frame. The encoded source and parity bits are sent to the convolutional encoder 26 which operates, say, as in the previous example at rate 1/2, to provide 378 bits made from the 50 very sensitive bits and 3 parity bits, and the 132 sensitive bits and the four tail bits. The remaining 78 bits are sent directly to the channel 28 along with the convolutionally encoded 378 bits. The signals are then transmitted over the channel 28 whether that be a wire or in the preferred case for use with cellular phone wireless channel. The received convolutionally encoded source and parity signals at 48 are sent to a modified convolutional decoder 30. The convolutional decoder 30 includes a Viterbi decoder. The Viterbi algorithm is well understood by those skilled in the art. FIG. 4 illustrates the processing used by the Viterbi algorithm for a frame with an incoming stream of data consisting of two bit words. In the Viterbi algorithm (which is a trellis search technique) a series of metrics are computed. Applicants' algorithm uses the metrics from the best path to compute a confidence level that a particular parameter has been corrupted as follows:

$$C_j = \frac{\hat{M}_k - \hat{M}_{k-B_j}}{M_k - M_{k-B_j}}$$

where $\hat{M}_k$ is the metric of the best path at time k in the noisy channel case and $M_k$ is a metric of the best path at the time k in the case of a channel with no errors (the latter is a constant and could be pre-computed). The parameter of interest, B, is comprised of $B_j$ bits. When the confidence is one or near one, it indicates that the parameter is very likely correct and when the confidence is small (for example zero), it indicates that the parameter is very likely incorrect. For each parameter, the decoded parameter value may be retained only if its confidence level is larger than a pre-selected threshold; the parameter value is discarded if the confidence level is smaller than said threshold. The thresholds that correspond to different parameters are chosen to optimize the speech quality for the particular channel of interest. The Viterbi algorithm essentially comprises a maximum likelihood process that includes, as a key computation, computation survivor metrics; mainly, some paths survive and some do not during the processing of the Viterbi algorithm. By discarding some paths, the Viterbi algorithm remains computationally efficient. At the same time, of course, by discarding some paths, from time to time a potential for error arises. If a decision to discard must be made at a time when only the equivocal information is available as to a likelihood that one path of many is a particular better choice than the others, a decision to discard made at that time may lead to erroneous results ultimately. If the reader is interested in additional information regarding Viterbi decoding of convolutional codes the reader may wish to consider the article entitled, "The Viterbi Algorithm", by G. David Forney, Jr. as appears in the March 1973 issue of proceedings of the IEEE.

Figure 3:
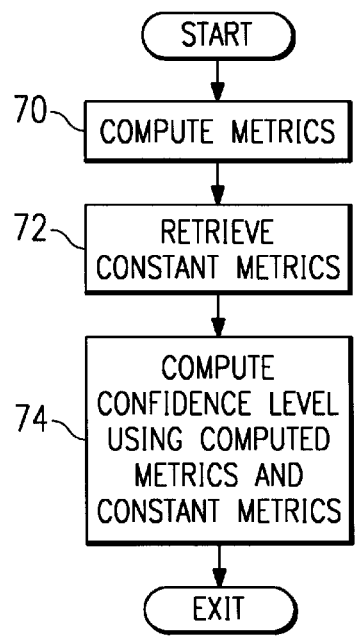
FIG. 3 is a flow chart for determining confidence levels.
Figure 5:
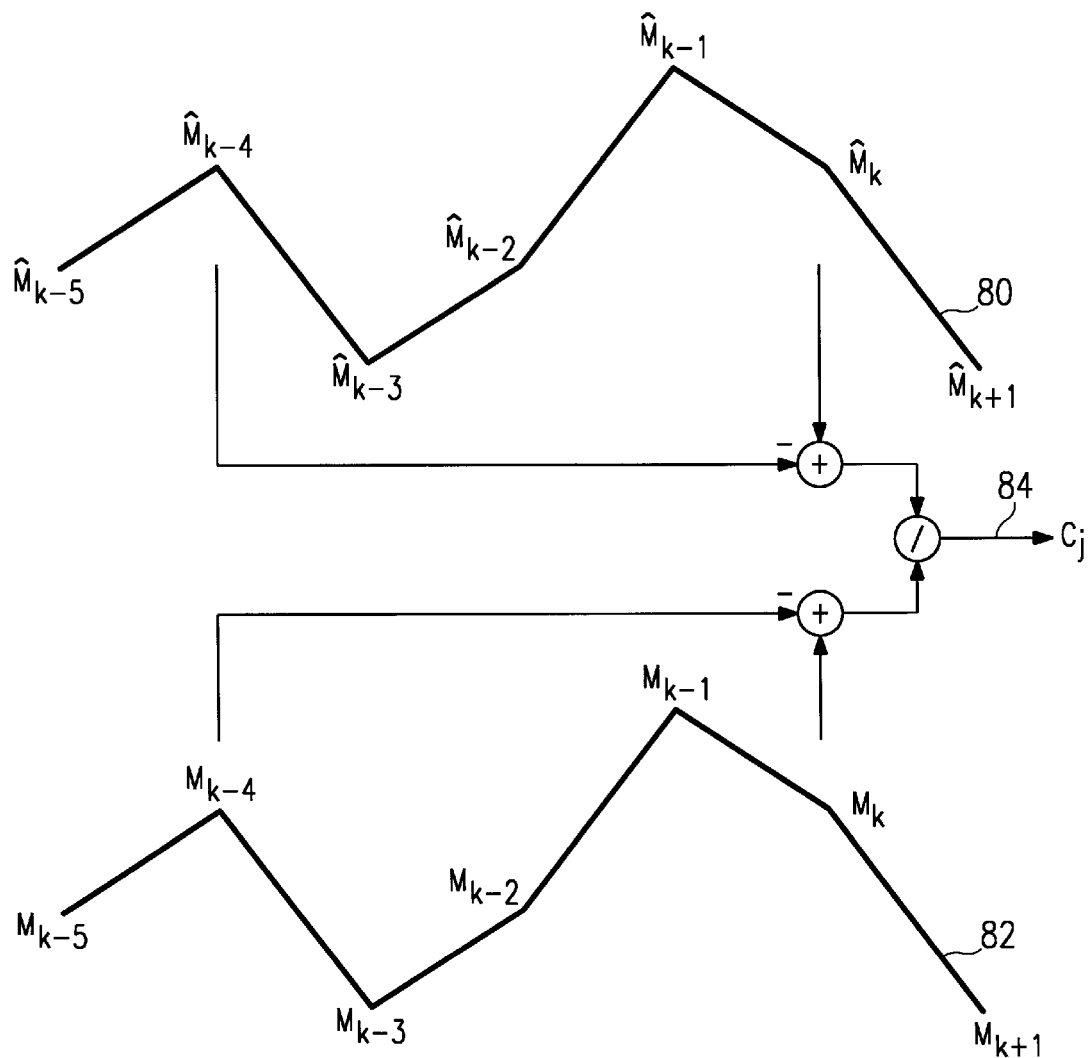
FIG. 5 illustrates computing the parameter confidence levels from the best path wherein the top path contains metrics used for the noisy channel and the bottom path contains the metrics in the clean channel.

In FIG. 4 there is illustrated an example of the trellis used in the 4 state Viterbi decoder. The best path is indicated by a heavy line. As stated previously, the computing of the confidence level at decoder 30 is done by the equation discussed above. Referring to FIG. 5 the top path contains the metrics $\hat{M}$ for the noisy channel and the bottom path are the metrics M for the clean channel. The bottom path metric values may be pre-computed. The operation for computing confidence levels would follow the flow chart of FIG. 3 where in step 70 the metrics would be computed for the noisy channel case as represented at the top half of FIG. 5 and the clean channel metrics represented by the bottom half of FIG. 5 would be retrieved from the pre-computed and prestored constant metrics in step 72. For example, the metric at point $\hat{M}_k$ is subtracted by metric at point $\hat{M}_k$–4 (4 bits away) divided by the metrics from the same points ($M_k$ and $M_{k-4}$) for the clean channel. From that the confidence level is determined using the equation discussed previously. This confidence level is computed for each of the parameters. This confidence level would be used to determine a bad parameter indicator (BPI). This represents a confidence level for a subset of the 182 bits (50 very sensitive bits+132 sensitive bits), in the above example. The subsets are the parameters. The parameters may be the LPC (Linear Prediction Coding) parameters of the frame, pitch, or gain, for example. The Viterbi decoded source and parity signals would be applied to the parity decoder 32 and the confidence levels computed would be applied to the modified parity failure detector 36. The decoded parity and computed parity signals would be applied from the parity decoder 32 at output 54. The detector 36 would compare the decoded parity with the computed parity and if not equal generate the BFI signal. The detector 36 would also generate BPI signals from the computed confidence levels. The data provided from the decoder 34 would be controlled by the BFI and the BPI. If the BFI indicates the frame is in error, the BPI can be used to detect which parameters are most likely uncorrupted and permit these to be provided out of the decoder 34 rather than discarding all parameters from the frame. If the BFI indicates there is no error, the BPI can be used to detect and discard those parameters likely to be corrupted. The confidence level thresholds used in deciding BPI are different for BFI=True and BFI=False cases. The thresholds are set higher for BFI=True than for BFI=False.

Figure 6:
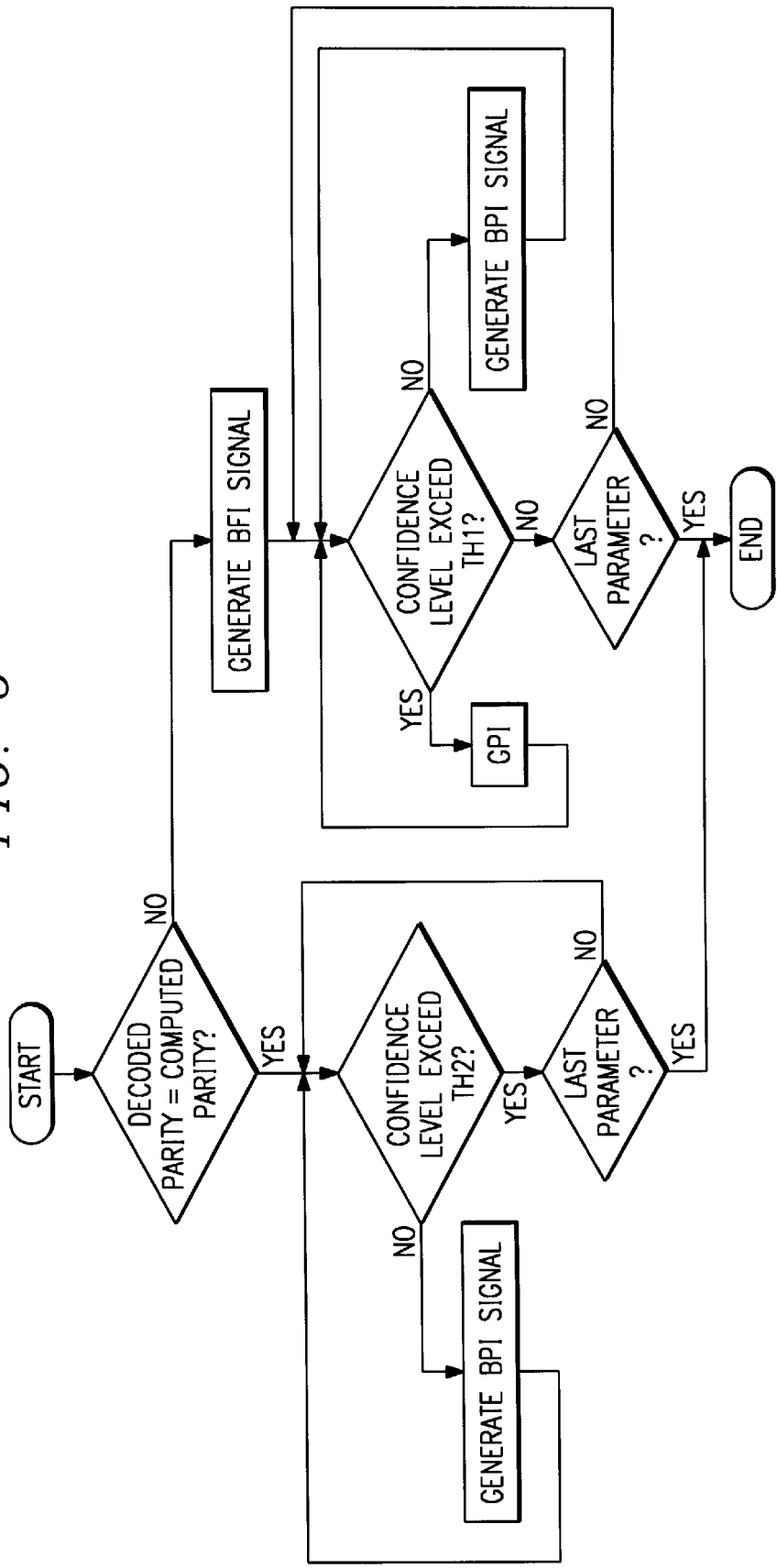
FIG. 6 illustrates a flow chart for the modified parity failure decoder of FIG. 2.

Referring to the flow chart of FIG. 6, in accordance with one embodiment, the first step is determining if the decoded parity is equal to the computed parity. If yes, in accordance with one embodiment the convolutionally decoded source signals would then be provided out of source decoder 34 because no BFI signal is generated.

In accordance with another embodiment of the present invention, a BPI confidence measurement for each of the individual parameters would then be compared to a corresponding confidence threshold level (Threshold TH2) and if that confidence level exceeds the threshold, then that parameter would be provided out of the decoder. If the confidence level was below the threshold, then a BPI flag would be set, which would then be coupled to the decoder 26 to prevent that parameter set from being provided out of the decoder even though parity check was good (no BFI) and in its place the previous frame value for the parameter would be provided. In the case of the decoded parity not being equal to the computed parity, unlike the standard GSM full rate case, a threshold test would undergo for each parameter to determine if the confidence level for that parameter was above or below a second threshold (TH1). The threshold TH1 would be a higher threshold than threshold TH2. For each parameter it would be determined whether the confidence level for each parameter was above the threshold level reached even though BFI flag was set.

If the confidence level was high enough a good parameter indicator is generated (GPI) and for that parameter it would override the BFI flag signal. During the presence of that good parameter indicator (GPI) the corresponding parameter is provided out of the decoder 34. The threshold TH1 or TH2 can be different for different parameters. As noted above, the threshold values are chosen by optimizing the speech quality for a given noisy channel.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of error detection and error concealment, comprising the steps of:
    encoding data at the transmitter with the most sensitive data being encoded and provided with parity bits and convolutionally encoding the most sensitive data and parity bits and certain other portions of the data;
    transmitting said data over a transmission channel;
    convolutionally decoding said data;
    determining the confidence level (Cj) of the decoded parameter on a parameter by parameter basis according to $\hat{M}_k - \hat{M}_{k-Bj}/M_k - M_{k-Bj}$ where $M_k$ is the metric of the best path at time k in a noisy channel case and $M_k$ is the metric in case of a channel with no error, parameter B is comprised of $B_j$ bits providing a bad parameter signal indicator (BPI) signal if the confidence level is below threshold;
    computing parity for the most sensitive decoded data and comparing with the decoded parity to provide a bad frame indicator (BFI) signal if there is a parity error; and
    receiving and utilizing said decoded data according to said BFI signal and said BPI signals jointly in the decision to discard the received decoded data.

2. The method of claim 1 wherein if BFI indicates a frame error, BPI is used to detect parameters most likely uncorrupted and permit these parameters to be provided out rather than discard all parameters from the frame.

3. The method of claim 2 where if there is no error, the BPI is used to discard parameter likely to be corrupted.

4. The method of claim 3 wherein the confidence level thresholds used in deciding BPI are different for BFI is True and BFI is False cases.

5. The method of claim 4 wherein the threshold level is higher for BFI is True rather than False cases.

6. The method of claim 1 including the step of providing the convolutionally decoded source signals if there is no BPI signal.

7. The method of claim 1 wherein if the confidence level is above a second threshold level, then that parameter would be provided and if below said second threshold then that parameter would not be provided out even if there is no BFI signal and in its place, the previous frame value is provided.

8. The method of claim 7 wherein even if the BFI signal is present and the confidence level of the parameter is above a first higher threshold than the second threshold then the presence of this good parameter overrides the BFI signal and the parameter is provided out of the decoder.

* * * * *